March 12, 1957 W. N. BATHURST ET AL 2,784,728
VALVE CONTROL SYSTEM FOR HYDRAULIC
DYNAMOMETERS, BRAKES AND COUPLINGS
Filed Dec. 23, 1953 4 Sheets-Sheet 1

March 12, 1957  W. N. BATHURST ET AL  2,784,728
VALVE CONTROL SYSTEM FOR HYDRAULIC
DYNAMOMETERS, BRAKES AND COUPLINGS
Filed Dec. 23, 1953  4 Sheets-Sheet 4

Inventors
William Neville Bathurst
Ivor Maurice Jarvis
By
Morris & Bateman
Attorneys United States Patent Office 2,784,728
Patented Mar. 12, 1957

2,784,728

VALVE CONTROL SYSTEM FOR HYDRAULIC DYNAMOMETERS, BRAKES, AND COUPLINGS

William N. Bathurst and Ivor M. Jarvis, Worcester, England, assignors, by mesne assignments, to Heenan & Froude Limited, Worcester, England, a company of Great Britain Application December 23, 1953, Serial No. 400,068

1 Claim. (Cl. 137—47)

This invention relates to improvements in a valve control system for hydraulic brakes, dynamometers and clutches of the type in which the rotation of a primary element is resisted by hydraulic interaction with a secondary element contained in a working compartment, both the elements being vaned, or both the elements being without vanes, or one element being vaned and the other being without vanes, the degree of finish of the unvaned surface or surfaces varying from rough castings to a high polish or having holes or projections of any convenient form.

When such apparatus is constructed for use as a brake the secondary element is anchored against rotation while the primary element is driven by any source of power, the magnitude of which is proportional to torque and rotational velocity. When constructed for use as a dynamometer the secondary element is restrained against rotation by the application of a force the amount of which can be measured. When constructed for use as a clutch both elements are free to rotate while transmitting power at different rotational velocities. In the following description the word "brake" is understood to include also dynamometers and clutches.

It is usual to provide a brake of the aforesaid type with means for varying the amount of power absorbed or transmitted by controlling the rate of influx or efflux of the hydraulic fluid to or from the elements, means for this purpose being described, for example, in the specification of prior U. S. Patent No. 2,162,541.

Under running conditions of the brake a pressure is generated in the working compartment by reason of the interaction of the elements. This internal pressure and the power absorbed or transmitted tend to increase with increase of relative speed of the elements or absolute speed of the primary element.

One method of controlling the action of a hydraulic brake, dynamometer or clutch is described in the prior Patent No. 2,162,541 hereinbefore referred to, where a hydraulically controlled mushroom valve is used to control the egress of fluid from such hydraulic apparatus. With this method of controlling the valve the response of the apparatus to change of load and speed as provided by their prime mover introduces some time lag in the sequence of events of the controlling hydraulic circuit.

Furthermore, with known forms of apparatus where a positive displacement pump running at a speed proportional to that of the brake is used to provide the source of controlling pressure, the characteristic of the force applied to the mushroom valve may not follow the ideal law owing to internal pump leakage.

The present invention is an improvement upon that disclosed in the aforesaid patent, the object being to provide improved means of controlling the mushroom valve which will reduce time lag and improve the steepness of the torque/speed characteristic.

This object is achieved according to the present invention by controlling the mushroom valve by a pressure generator comprising a rotor mounted on a shaft driven at the same speed as or at a speed proportional to the speed of the shaft of the machine and surrounded by a stationary casing forming a working compartment, an inlet compartment arranged at one side of the working compartment and communicating therewith through an annular space, an outlet compartment arranged at the other side of the working compartment and also communicating therewith through an annular space, the inlet compartment being fed with fluid, the outlet compartment being provided with an outlet drain and the working compartment being connected to the means controlling the mushroom valve.

A further feature of the invention comprises a novel arrangement of control piston with a leakage characteristic which is designed to improve the overall torque/speed characteristic of the brake.

The invention is illustrated in and will be described with reference to the accompanying drawings, in which.

Figure 1:
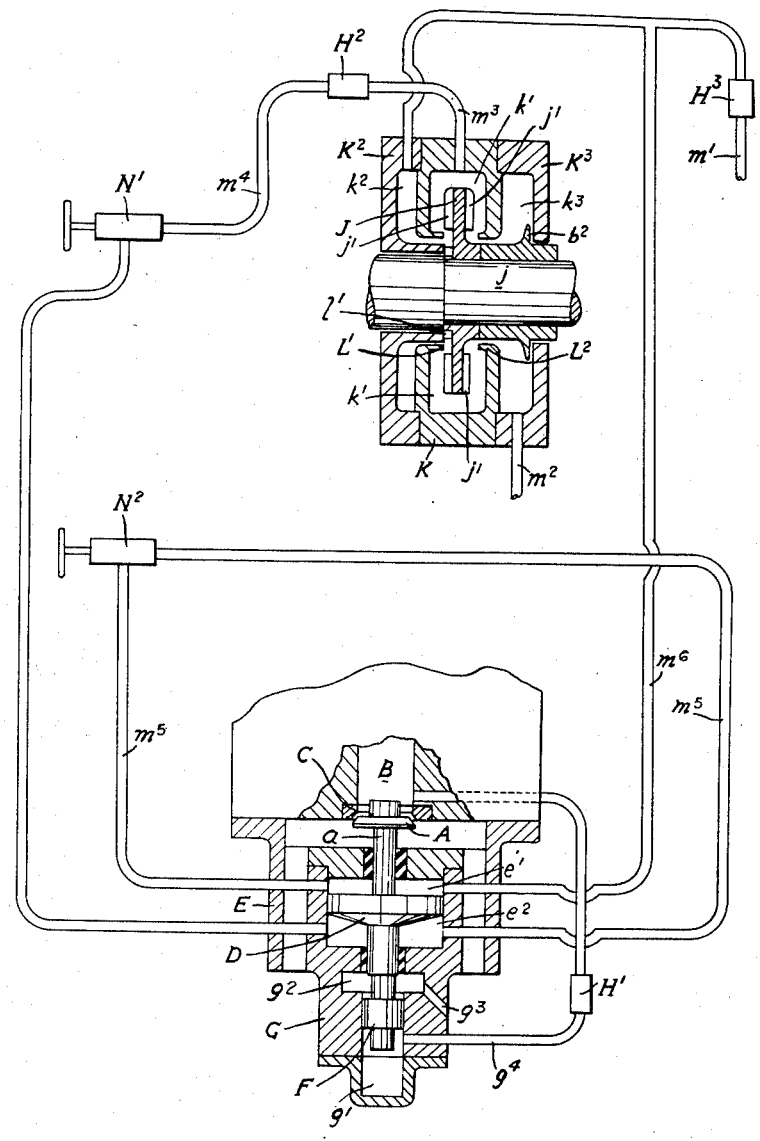
Fig. 1 is a diagrammatic view illustrating the principle of the invention, the valve in the outlet being controlled by liquid derived from the pressure generator, which is driven at a speed proportional to the speed of the primary element of the brake.
Figure 2:
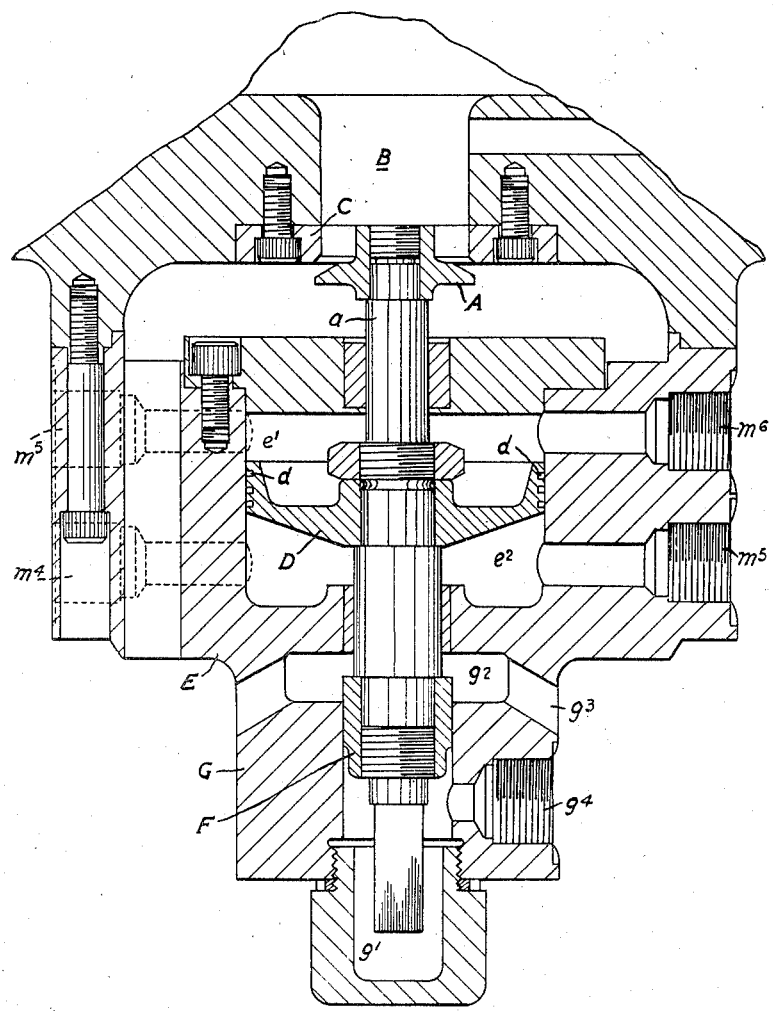
Fig. 2 is a section of the assembly comprising the outlet valve together with its controlling piston; in the following description this will be referred to as the back pressure valve assembly.

The carrying out of the invention will be understood by reference to the views shown in Figs. 1 and 2.

In these views, a valve A of disc or mushroom type is arranged in the egress B from the working compartment of the hydraulic brake, which may be of the type disclosed, for example, in the aforesaid patent, the position of this valve A relative to its seating C controlling the flow of liquid from the brake.

The valve A is connected by means of a rod or spindle $a$ to a piston D which is enclosed in a cylinder E, thereby separating it into two chambers $e^1$ and $e^2$.

To the rod $a$ is also secured a second piston F enclosed in a cylinder G and separating it into two chambers $g^1$ and $g^2$. The chamber $g^2$ is arranged to be maintained at substantially atmospheric pressure by means of venting or drainage passages $g^3$.

The chamber $g^1$ is connected to the egress passage B of the brake by means of the pipe $g^4$ in which a filter $H^1$ may be arranged.

The purpose of the piston F is partly, but not wholly, to balance the hydraulic force imposed upon the rod $a$ through the valve A by reason of the hydraulic pressure existing at the outlet B, thereby reducing the force requirements from the piston D by reason of the difference between the pressures in the chambers $e^2$ and $e^1$. While it is not essential to provide means of balancing the hydraulic pressure on the valve A, in many cases such has the advantage of keeping the size of the piston D reasonably small and reducing the pressure requirements from the pressure generator.

Figure 3:
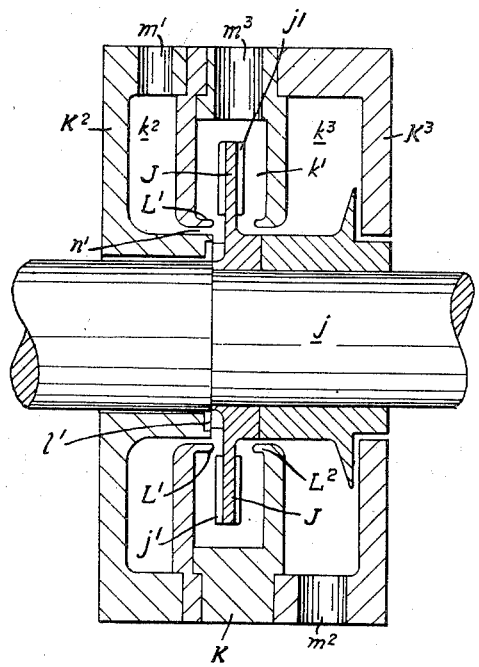
Figs. 3 and 4 show two views of the pressure generator or pump.
Figure 4:
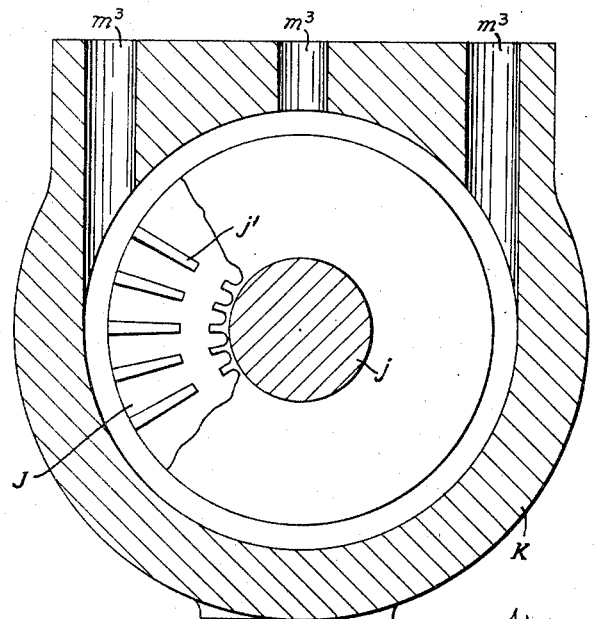

The pressure generator is shown diagrammatically in Fig. 1 and in greater detail in Figs. 3 and 4. It consists of a rotor J carried on a shaft $j$, and surrounded by a stationary casing K forming a rotor compartment $k^1$. Additional stationary members $K^2$ and $K^3$ form inlet and outlet compartments $k^2$ and $k^3$ respectively. The shaft $j$ may be an extension of the primary shaft of the brake or it may be an independent shaft mounted in its own bearings and driven at the same speed as or at a speed proportional to the speed of the primary shaft.

The rotor J and the inner walls of the chamber $k^1$ may be either vaned or plain, but in the preferred arrangement the rotor is provided with shallow vanes $j^1$ and the rotor chamber $k^1$ has smooth walls.

The pressure generator is fed continuously with water or other fluid through a pipe $m^1$, in which a filter $H^3$ may be arranged, to the inlet compartment $k^2$ and thence through the annular space $n^1$ formed by the lip $L^1$ into the working compartment $k^1$ where it is accelerated tangentially by the action of the rotor J. It is then discharged through the annulus formed inside the lip $L^2$ into the outlet compartment $k^3$ and thence by the pipe $m^2$ to drain or to a sump chamber for re-circulation.

The lips $L^1$ and $L^2$ are disposed in a radius nearer to the axis of rotation than the outer edge of the rotor J, the lip $L^2$ thus acting as a weir over which the fluid passes from the working chamber $k^1$ to the outlet chamber $k^3$ thereby maintaining the filling of the working chamber substantially constant despite fluctuations in the rate of flow of fluid to the pressure generator and fluctuations in the rate of bleed of fluid to the control system and also ensuring a constant pressure difference between the ingoing fluid and the pressure generated at a given speed of rotation.

The diameters of the lips $L^1$ and $L^2$ may be equal or the diameter of the lip $L^2$ may be slightly greater than the diameter of the lip $L^1$ to facilitate the passage of water from the chamber $k^2$ through the chamber $k^1$ into the outlet chamber $k^3$.

Sealing vanes $l^1$ are formed on the inlet side of the rotor and in addition a seal $b^2$ is provided to prevent leakage of the fluid from the inlet and outlet compartments $k^2$ and $k^3$ respectively along the shaft $j$.

A passage $m^3$ is formed in the periphery of the casing $K^1$ and this passage may be either radial or tangential with respect to the circular contour of the inside of the casing.

A pipe $m^4$, in which a filter $H^2$ may be arranged, connects the pressure generator outlet passage $m^3$ through a valve $N^1$, preferably of needle type to give fine control, to the back pressure valve piston chamber $e^2$. A pipe $m^5$ connects the chamber $e^2$ to the chamber $e^1$ and a second valve $N^2$, also preferably of needle type, is arranged in the pipe $m^5$. The chamber $e^1$ is also connected by means of the pipe $m^6$ back into the inlet compartment $k^2$ of the pressure generator.

In operation it will be clear that the working compartment $k^1$ of the pressure generator will always contain the same volume of fluid so that at any given speed of rotation the difference between the pressure in the passage $m^3$ and the inlet compartment $k^2$ will always be substantially the same regardless of the rate of flow through it. This pressure will also be substantially proportional to the square of the speed of rotation of the pressure generator rotor J and consequently of the primary member of the brake.

When the valve $N^1$ is fully opened and the valve $N^2$ is fully closed there will be no flow of fluid through the pipes $m^4$, $m^5$ and $m^6$ except that arising from leakage from the chamber $e^2$ to the chamber $e^1$ past the piston D, and at a given speed of rotation of the primary element of the brake the maximum force tending to close the valve A will be available, and this will correspond to the condition of maximum torque absorption of the brake, as the slip in the cup ring is then at a minimum.

By increasing the restriction derived from valve $N^1$ to the flow of fluid and reducing the restriction to the flow of fluid derived from the valve $N^2$ the force tending to close the valve A will be reduced progressively until it approaches zero. In this condition the torque transmitted or absorbed by the brake will be at a minimum.

When the apparatus is used as a dynamometer or brake it is desirable that the torque shall rise with speed according to the propeller or square law or some approximation to it. With many forms of hydraulic apparatus used for this purpose the torque will rise approximately as the square of the speed if the pressure in the outlet passage B is controlled so that it also rises as the square of the speed.

When the controlling pressure source or pressure generator is constructed as hereinbefore described it is found to have a pressure/speed characteristic which closely follows the square law. Thus if the valves $N^1$ and $N^2$ are set to give maximum differential pressure about the piston D, and if there were no leakage past the piston D, the pressure at the outlet B will also follow a square law with respect to speed. The same relationship will also exist as the valves $N^1$ and $N^2$ are adjusted to reduce the differential pressure about the piston D so long as the pressure drop/flow characteristics of the valves follows a square law relationship and there is no leakage past the piston D when the pressure difference at the piston D follows a square law with respect to this leakage.

If the leakage flow past the piston D is controlled by means of a smooth piston the flow tends to be laminar and so does not follow the required relationship with respect to the differential pressure. To overcome this disadvantage and ensure turbulent flow the piston D is provided with one or more sharp edged annular grooves $d$ at close pitch, as is shown in Fig. 2.

Figures 5, 6:
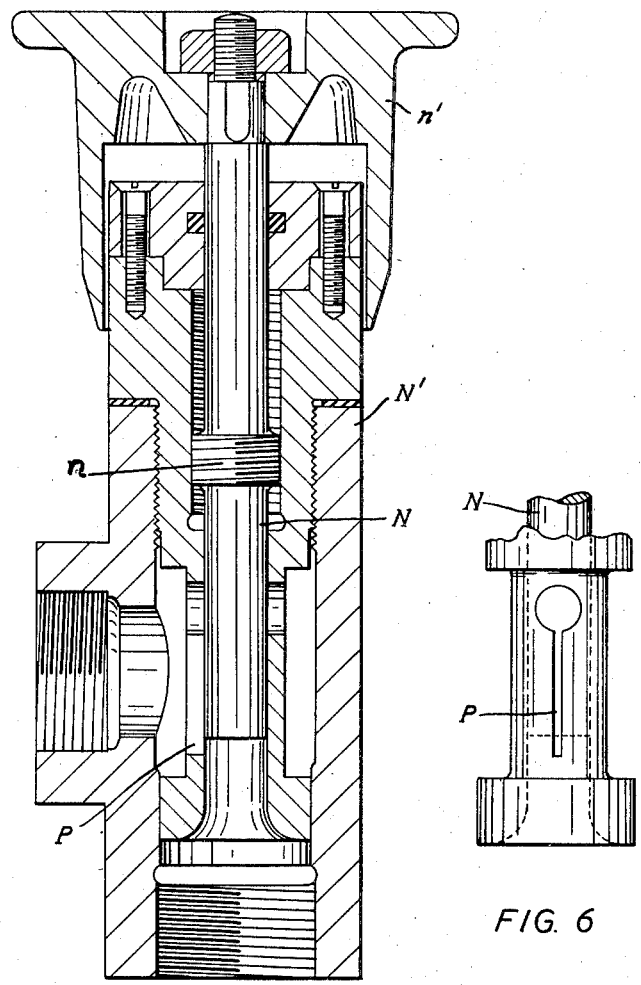
Fig. 5 is a section through the controlling valves.
Fig. 6 shows the shape of the port of the control valve.

Similarly it is desirable that the pressure drops through the valves $N^1$ and $N^2$ shall follow a square law relationship with respect to the flow. One way of achieving this is shown in the construction of valve $N^1$ or $N^2$ illustrated in Figs. 5 and 6 where the controlling fluid is caused to flow through sharp edged ports P which are varied in effective area by moving the spindle N axially, which may be done by forming the spindle N with a screw threaded portion $n$ and rotating it in the casing $N^1$ by a hand wheel $n^1$ or by other suitable means.

If it is desired to arrange for the brake to have a torque/speed characteristic greater than the square law relationship according to which the torque varies as the square of the speed of the brake shaft, this can be done by modifying the primary valve $N^1$ so that its pressure flow characteristic drops below the square law relationship, at the same time arranging the combined pressure/flow characteristic of the secondary valve $N^2$ and the piston D to keep to a square law characteristic.

In a modification of the method of operating the control of the brake the valves $N^1$ and $N^2$ may be built into a combined unit so that both valves may be operated by one handwheel, or when remote operation is required, by means of one motor.

It is usual to feed water or other cooling liquid to the brake to take away the heat generated in the absorption of power and to control the inflow of the liquid by means of a hand or motor operated valve approximately in accordance with the power requirements. For this method may be substituted a thermostatic control of the inflow of the cooling liquid by any well-known means. The sensitive signalling element may be placed inside the brake casing or in the stream of liquid flowing from it and the automatic valve controlling the supply of cooling liquid placed in the piping system feeding the brake. At any particular setting of the load control an increase in speed of the prime mover will then cause additional power to be absorbed which will in turn cause additional cooling liquid to be fed to the apparatus.

It has been found that the use of this method of controlling the flow of cooling liquid to the brake, besides making for convenience of operation, has the additional effect of increasing the index of the relationship of torque with respect to speed.

What we claim is:

Hydraulic valve control means comprising a pressure generator comprising a rotor, a shaft on which the rotor is mounted for rotation, a stationary casing surrounding the rotor and divided into a central working compartment in which the rotor is rotatable, an inlet compartment at one side of the working compartment and communicating therewith, and an outlet compartment at the other side of the working compartment and communicating therewith, means for feeding fluid to the inlet compartment, and a drain for the outlet compartment, in combination with a mushroom valve, and hydraulic valve operating means comprising a piston connected to said valve for operating the same, a chamber in which said piston is reciprocable, means connecting said chamber at one side of said piston to the working compartment of said pressure generator, means connecting said chamber at the other side of said piston to the first-mentioned side thereof and also to the inlet compartment of the pressure generator, a controlling valve between the working compartment of the pressure generator and the first-mentioned side of said chamber, a second chamber, a second piston reciprocable in said second chamber and connected to the first-mentioned piston, the second chamber at one side of the second piston communicating with the atmosphere, and means connecting the second chamber at the other side of the second piston to the inlet side of the mushroom valve.

References Cited in the file of this patent

UNITED STATES PATENTS

| | | |
|---|---|---|
| 1,042,616 | Snow | Oct. 29, 1912 |
| 2,116,992 | Weaver | May 10, 1938 |
| 2,162,541 | Walker | June 13, 1939 |
| 2,392,262 | Ramsey | Jan. 1, 1946 |
| 2,421,056 | Dake et al. | May 27, 1947 |
| 2,450,199 | Leibing | Sept. 28, 1948 |
| 2,534,974 | Jacobs | Dec. 19, 1950 |
| 2,634,830 | Cline | Apr. 14, 1953 |
| 2,652,853 | Ranzi | Sept. 22, 1953 |

FOREIGN PATENTS

| | | |
|---|---|---|
| 466,436 | Great Britain | May 28, 1937 |